Aug. 9, 1932.  E. H. REMDE  1,870,689
INDUSTRIAL TRUCK
Filed June 30, 1928   6 Sheets-Sheet 1

INVENTOR.
Edward H. Remde
By Geo. B. Pitts
ATTORNEY.

Aug. 9, 1932.  E. H. REMDE  1,870,689
INDUSTRIAL TRUCK
Filed June 30, 1928   6 Sheets-Sheet 4

INVENTOR.
Edward H. Remde
BY
Geo. B. Pitts
ATTORNEY.

Aug. 9, 1932.   E. H. REMDE   1,870,689
INDUSTRIAL TRUCK
Filed June 30, 1928   6 Sheets-Sheet 5

Aug. 9, 1932.  E. H. REMDE  1,870,689
INDUSTRIAL TRUCK
Filed June 30, 1928   6 Sheets-Sheet 6

Patented Aug. 9, 1932

1,870,689

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed June 30, 1928. Serial No. 289,462.

This invention relates to an industrial truck capable of handling loads, more particularly where the loads are bulky or relatively large in size or heavy and where the same are to be transported through areas of limited size or area or to be positioned in or removed from areas of predetermined sizes or extent, such for example, freight cars or other carriers. The truck is capable of not only handling bulky or heavy loads in a rapid manner economically, but of positioning them in a predetermined area or space, such as a freight car or other form of carriers in any desired order to the end that the full capacity of such area or space may be utilized.

The truck is of the sectional type whereby the range of load handling operations is increased particularly with respect to relatively long loads where the same are to be transported into limited areas and discharged therein in predetermined positions or picked up in such areas and transported to any desired station.

One object of the invention is to provide an improved truck of this character comprising a traction portion and a load carrying portion and mechanism under control of the operative for operating the latter portion into position either to support the load while transporting it or into an inclined position, whereby the operative may operate the truck to effect the picking up of a load or its discharge in a predetermined position.

Another object of the invention is to construct a truck of this character that is relatively simple in construction but capable of handling relatively bulky or heavy loads in a rapid and economical manner.

Another object of the invention is to construct a truck capable of supporting relatively heavy or large loads and conveying them through passages having relatively little area for turning, where trucks of the ordinary type could not be used.

Heretofore great difficulty and expense has resulted in shipping in freight cars relatively heavy and large boxes, bulky material and bound together metal sheets, especially where such crated or bound together sheets weigh several tons. In the shipments of such packages it is desirable to load them in side by side relation in a freight car, but so far as I am aware, the trucks or other apparatus for handling loads heretofore used even when increased in size and strength have been incapable of being driven into the car and discharging such a package or packages therein in proper position to insure loading of the car to its full capacity or of being driven into a loaded car and picking up each load and conveying it to its place of storage or use. It is therefore another object of my invention to provide a truck capable of handling such loads into and out of a freight car, whereby the latter may be rapidly and economically loaded or unloaded.

Other objects of the invention will be apparent to those skilled in the art to which my invention relates from the following description taken in connection with the accompanying drawings, wherein.

In the drawings, 1 indicates as an entirety a load handling and transporting truck. The truck comprises generally a traction and controlling section 2 and a loading or unloading and carrying section 3 for the load, said sections being inter-connected for steering and propelling purposes in a manner to be later described, whereby loads of bulky or heavy material or packages large in size or heavy in weight and particularly loads which are both relatively large and heavy may be handled with facility and conveyed through passages having relatively short turning areas and into and out of freight cars or other carriers in a manner which permits the cars or carriers to be economically loaded with respect to the loading or unloading operations and to be economically shipped with respect to the space available therein. The section 2 consists of a suitable frame 4 mounted on wheels 5, 6; by preference the former being steerable by means of a lever 7 and the latter being driven by a motor 8 through a suitable power transmitting mechanism. 9 indicates a pair of uprights secured to the outer end of the frame 4 and supporting the steering lever 7 and other parts to be referred to. 10 indicates a platform for an operative mounted on brackets secured to the lower ends of the uprights 9. 11 indicates a foot pedal associated with the platform 10 and connected through a suitable linkage (not shown) with a brake mechanism 12, which operates to engage and release a wheel driven by the motor 8. 13 indicates the batteries for supplying current to the motor 8 and a motor 14 to which reference will later be made. 15 indicates a controller for the motor 8, being operated by a handle or lever 16.

Figure 7:
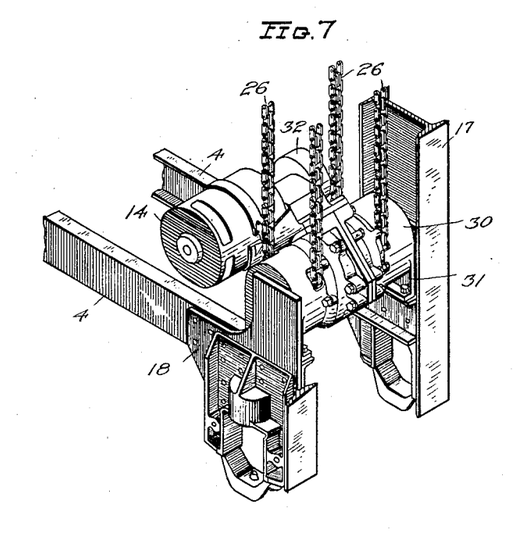
Fig. 7 is a fragmentary perspective view of a portion of the traction section frame and the lower portion of the guide, the motor and the driving mechanism for the raising and lowering elements.

17 indicates a guide frame preferably mounted on and secured to the frame 4 at or near its inner end, that is, the end opposite to the operative's platform 10. The guide frame preferably comprises a pair of spaced I-beams each secured to one sill of the frame 4 by a plate 18 (Fig. 7). The upper end of each I-beam 17 is connected to a bracket 19 which in turn is connected to a brace member 20, the outer end of the latter being connected to the adjacent upright 9.

21 indicates as an entirety an operating device or member movable upwardly and downwardly on the guides 17, being provided with pairs of rollers 22 which engage opposite portions of the beams. The operating member 21 preferably comprises sets of plates 21a connected in spaced relation in any suitable manner, the intermediate plates 21a′, 21a′, being connected by an angle 23 and a shaft 24, the latter rotatably supporting a sleeve 25 which will be later referred to. The plates 21a′ are extended outwardly beyond the plates 21a and the shaft 24 is mounted in these extended portions for a purpose which will later appear. Suitable mechanism is provided for raising and lowering the member 21, such mechanism comprising in the illustrated form of construction one or more endless flexible elements (two being shown)—such as chains 26—running over suitable sprockets 27, one pair of sprockets being mounted near the lower portion of the guides 17 and the other pair being mounted at or near the upper end of the guides. Where the sprockets 27 near the lower portion of the guides 17 are driven (as herein illustrated), the upper sprockets are loosely mounted on a shaft 28 supported at its opposite ends by the guides 17. At one point in its length, each chain 26 is provided with a suitable link 26a, which is connected to the angle 23, so that the chains may move the member 21 upwardly and downwardly, a predetermined distance or to an intermediate position by driving the lower sprockets 27 first in one direction and then in the other, as desired. For these purposes, the lower sprockets are driven in either direction to positively move the member 21 downwardly as well as upwardly.

The lower sprockets 27 are mounted on a shaft 29 rotatably supported in a casing 30. The opposite ends of the casing are provided with standards 31 which are suitably secured to the frame 4 (see Fig. 7). The driving means for the shaft 29 are also mounted in the casing 30 and connected in a well known manner to the shaft of the motor 14. 32 indicates a magnetic brake, connected in the circuit for the motor 14 in series therewith and so arranged that the brake is released when the circuit is closed to operate the motor. 14a indicates a controller for the motor 14 operated by a handle 14a′.

The load lifting and carrying section 3 includes a wheel mounted platform 33 mounted to rock about a transverse axis, its inner end being connected to the operating member 21, whereby the raising or lowering of the latter will control the position of the platform 33 for transporting the load and for picking up the load or discharging it, the traction portion 2 co-operating with the operating member in carrying out these latter operations. In the form of construction shown in Figs. 1 to 5, inclusive, the connection between the inner end of the section 3 and the traction section 2 forms the sole connection between them; whereas in the form of construction shown in Figs. 11 to 15, inclusive, I provide an auxiliary connection, as will later appear.

Referring to Figs. 1 to 5, the section 3 comprises a frame 34 mounted on one or more pairs of wheels 35. At its inner end, the bars 34a of the frame 34 are connected by a connector 36 and the latter is provided with projecting arms 37 in which are formed aligned openings 38 adapted to register with an opening 39 formed in a hollow boss 40 carried by the sleeve 25. A pin or bolt 41 extends through the openings 38—39 and serves to connect the arms 37 and sleeve 25 together. As the openings 38—39 are at right angles to the opening through the sleeve, it will be seen that these parts serve as a universal joint connection between the section 2, 3. This connection therefore serves to permit the operating member 21 to move upwardly and downwardly to rock or tilt the platform 33 (see Fig. 4) and also to permit the sections 2, 3, to assume angular relations with respect to each other (see Fig. 1) in rounding curves or during the load picking up or discharging operation when the platform is in its rocked or tilted position. In this form of construction the frame 34 rocks or tilts about the axis of the wheels 35 and these wheels are preferably arranged rearward of a point or center midway of the inner and outer ends of the frame 34, so that when the latter is in horizontal position—which is the position thereof when transporting a load—the center of gravity of the load will be between the wheels 35 and wheels 6. When the section 3 is loaded, the weight of the load is carried by the wheels 35 and the operating device or elevating member 21.

I preferably provide two pairs of supporting wheels 35 for the frame 34, each pair being disposed at opposite sides of the adjacent bar 34a, whereby the weight of the load is distributed over a relatively wide area on the supporting surface to minimize danger of damaging such surface. In such arrangement the weight of the load is divided so as to insure ample tire material on the wheels, and hence minimize danger of unduly squeezing such material and lessening its life; furthermore, each pair of wheels is mounted to rock on a longitudinally extending shaft 52, whereby danger of tilting the load, when the wheels traverse uneven surfaces, is materially reduced. Each bar 34a of the frame 34 may consist of an I-beam and on the lower side thereof the beam is provided with a pair of angles 53 the depending portions of which are spaced from each other and support the opposite ends of the shaft 52. 54 indicates an axle which carries at its opposite ends the adjacent pair of wheels 35, the axle 54 being formed with a transverse opening through which the shaft 52 extends to serve as a trunnion therefor. The opposite sides of the axle 54 are flattened, as shown at 54a, and these flat sides have face to face bearing on wear plates 54b interposed between these sides and the depending portions of the angles 53 to prevent disalignment of the axle as it locks on the shaft 52. The opposite ends of the axle 54 are reduced to form shoulders for suitable rings 55 which form seats for the inner races of anti-friction bearings 56. These races are fixed in position against the rings by a cap plate 57 secured by cap-screws 58 to the axle. Each wheel 35 comprises a two part web, one part carrying the wheel rim and the other part being removably connected thereto. The inner portions of the web parts are shaped to form an annular chamber into which fits the races of the adjacent bearing 56.

Figure 4:
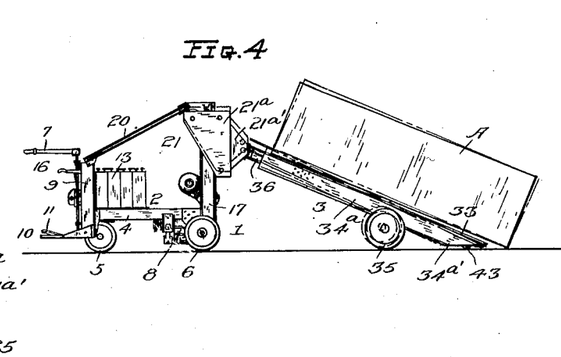
Fig. 4 is a view similar to Fig. 2, but showing the operation of picking up or discharging a load.
Figure 5:
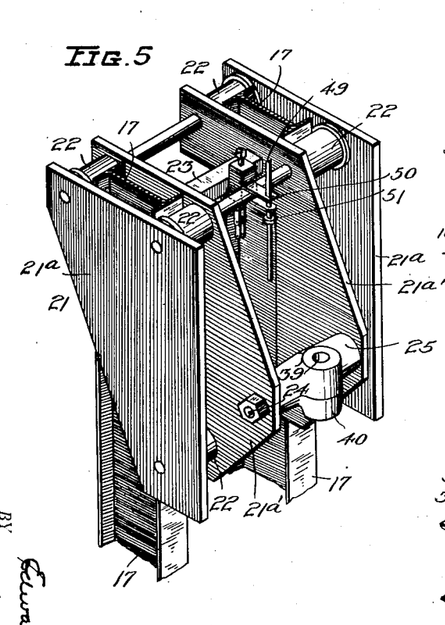
Fig. 5 is a perspective view of a portion of the guide frame and the operating device or elevating member which slides thereon and a portion of the load carrying section, the latter being detached from said device.
Figure 6:
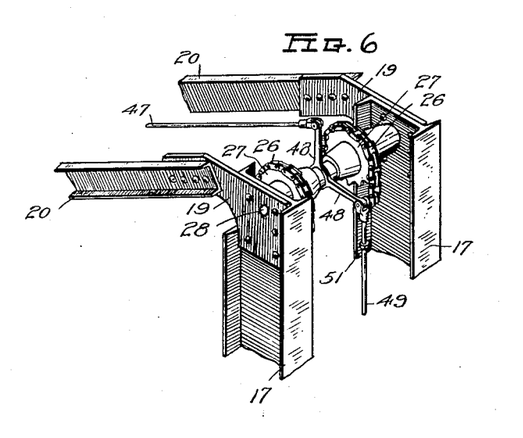
Fig. 6 is a fragmentary perspective view of the upper portion of the guide and showing the reeving or guide devices for the raising and lowering elements.
Figure 11:
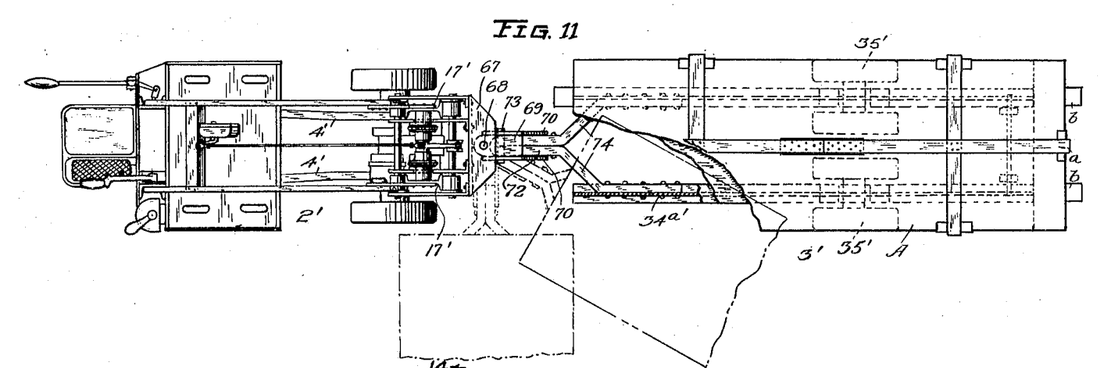
Fig. 11 is a plan view of a truck embodying my invention, but of a different construction, parts being broken away and a load being shown on the truck.
Figure 12:
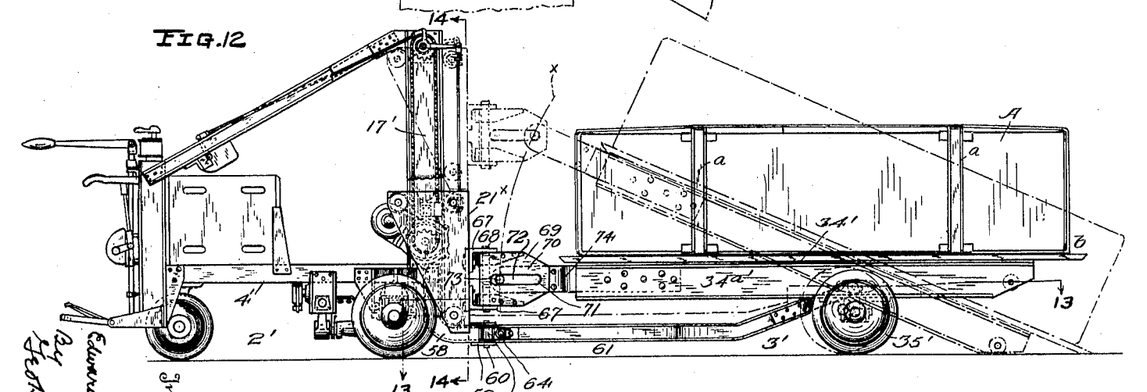
Fig. 12 is a side view of the parts shown in Fig. 11, parts being broken away.

The load may comprise a box, such as shown in Fig. 4 or bound together sheet material such as shown in Figs. 11 and 12. These forms of loads are shown merely for purposes of illustration; it not being intended that the invention or its application is to be limited thereby.

Figures 1, 2, 8, 9, 10:
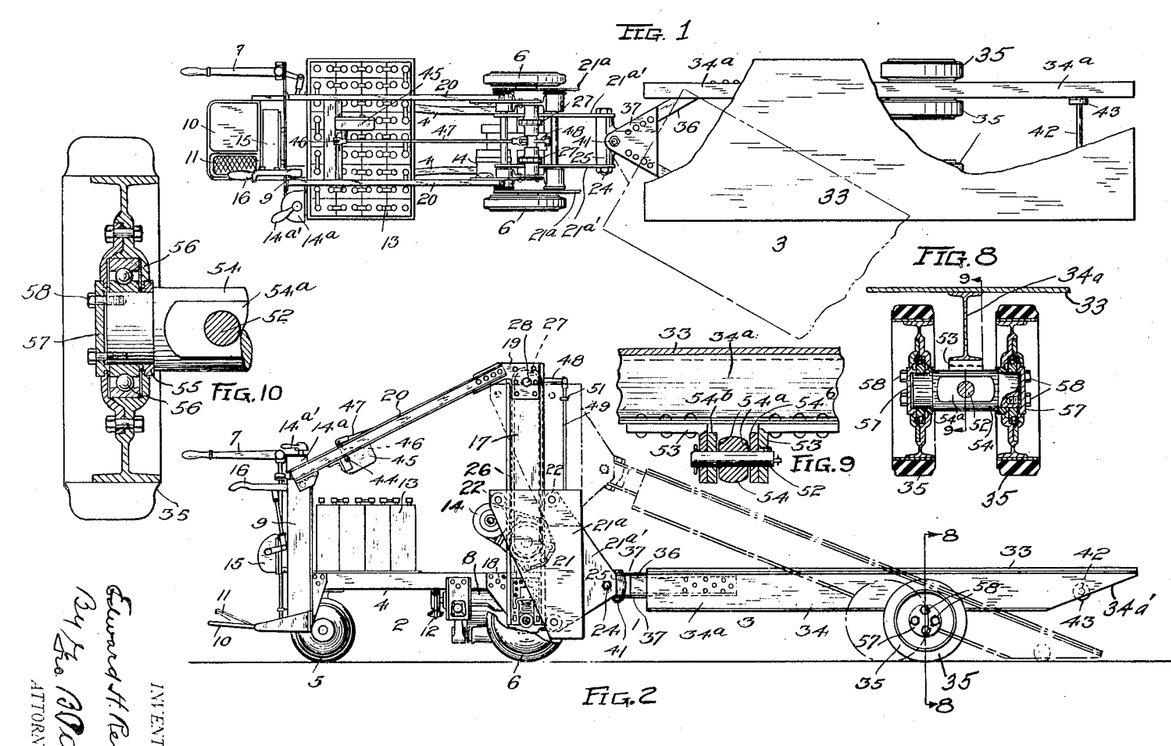
Fig. 1 is a plan view of a truck embodying my invention; parts being broken away.
Fig. 2 is a side view of the truck, parts being broken away.
Fig. 8 is a fragmentary section on the line 8—8 of Fig. 2.
Fig. 9 is a section on the line 9—9 of Fig. 8.
Fig. 10 is a fragmentary view of parts shown in Fig. 8, enlarged.
Figure 3:
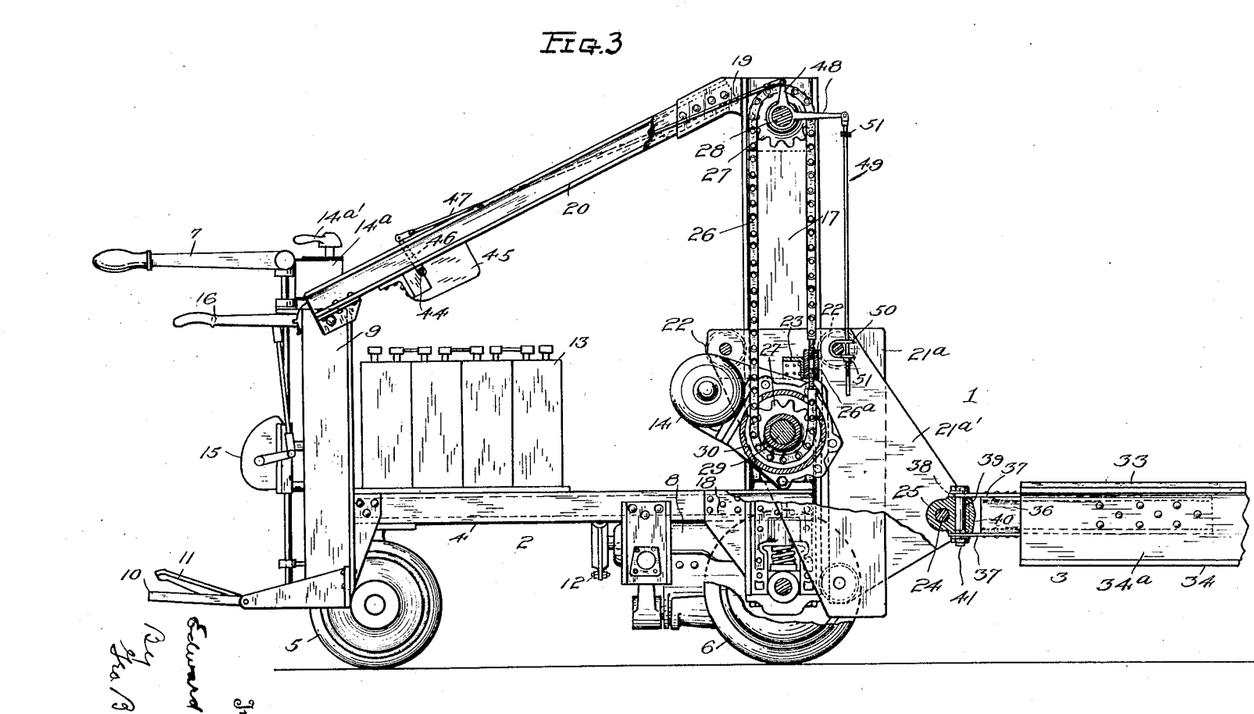
Fig. 3 is a fragmentary view of parts shown in Figs. 1 and 2, enlarged and partly in section.

The outer end of each bar 34a is cut-off on an inclined line 34a' so that the outer end of the platform 33 may be disposed close to the floor or supporting surface, as shown in Figs. 2 and 4. The free ends of the frame bars 34a are preferably connected by a rod 42 which serves as a shaft for a plurality of auxiliary supporting rollers 43 on which the outer end of the frame 34 rolls when picking up or discharging a load. The auxiliary rollers 43 are arranged to engage the floor and roll thereon to reduce the friction and to avoid sliding contact of the frame bars therewith, so that danger of the latter engaging an unevenness, which would obstruct the endwise movement of the platform in picking up a load, is eliminated; it being obvious that if the platform was tilted into as close a position to the floor as is desirable to enable its outer or free end to be projected below the adjacent end of the load as the preliminary operation of picking it up, the platform end or end of the frame bars 34a, due to slight over-tilting thereof or flexing of the frame 34 due to the weight of the load thereon or looseness of the connections between the sections 2, 3, would slide on the floor and possibly meet an obstruction therein which would materially affect if not prevent the picking-up operation. The rollers therefore permit the frame end to be positioned close to the floor, facilitates its endwise movement and eliminates the strain on the truck which would otherwise result if the frame end was not supported on the floor.

I provide a limit switch mechanism having pairs of switch contacts through one of which the circuit to the motor 14 is completed, when operating in either direction, and broken by a movable member connected to a rock shaft 44. The switch contacts and the movable member therefor are enclosed in a casing 45. The switch mechanism forms the subject-matter of my application filed January 5, 1923, Ser. No. 610,791 (see Letters Patent No. 1,726,717, dated September 3, 1929). The shaft 44 carries a lever 46 to which one end of a link 47 is pivotally connected. The opposite end of the link 47 is pivotally connected to one arm of a lever 48, fulcrumed on the shaft 28. From the other arm of the lever 48 depends a rod 49, the lower end of which extends through the openings formed in the arms 50 of a U-member straddling the shaft for one of the pairs of rollers 22. 51 indicates tappets adjustably secured to the rod 49 near its upper and lower ends, and one thereof being arranged to be engaged by one of the arms 50 when the operating member approaches its limit of movement when moving in either direction, and operating therethrough to move the rod 49 endwise, lever 48 and rod 47 to break the motor circuit. From the foregoing description, it will be seen that the motor 14 is stopped automatically when the member 21 reaches a predetermined position when moving upwardly or downwardly.

The operation of the truck: the loads are usually mounted on dunnage. To pick up a load A, the platform 33 is first rocked to the position shown in dotted lines in Fig. 2 by moving the member 21 upwardly. The truck is then driven toward one end or side of the load to project the outer end of the platform 33 below it; the driving of the truck is then continued, the effect of which is to cause the load to slide up the platform 33 while its opposite end or side rests on the floor, as shown in Fig. 4. When the center of gravity of the load has passed the axis on which the platform rocks, driving of the truck is stopped; then the operating member 21 is moved downwardly until the platform 33 assumes a substantially horizontal position. The load is then transported to its place of discharge. Where that end of the load in engagement with the ground has a tendency to slide thereon due to the forward movement of the platform to pick up the load instead of resisting such movement, a suitable abutment may be placed behind the load; also, where the load rests directly on the floor instead of upon dunnage, one end of the load is first propped up by a wedge or other device sufficiently to admit the platform end beneath it. To discharge the load A, the platform 33 is first tilted so as to cause the outer end of the load to engage the surface (for example, as shown in Fig. 4); then the truck is driven away from the load, thus allowing its inner end to slide down the platform 33. Where the friction between the load and platform is greater than that between its outer end and the surface and the load end slides on the latter when the truck is driven endwise, the operating member 21 may be raised so as to tilt the platform 33 at a greater angle, such as shown in dotted lines in Fig. 4, thereby reducing the area of contact between the load and platform and shifting of its center of gravity outwardly. When thus tilted, the wheels 35 are disengaged from the surface and the platform 33 is supported at one end by the operating member 21 and at its opposite end by the auxiliary rollers 43.

Where the load consists of sheet material bound together, for example by suitable bands $a$ (see Figs. 11 and 12), skids or dunnage $b$ are usually connected to the load and these skids slide on the platform 33 when the load is being picked up or discharged.

Figures 13, 14, 15, 17:
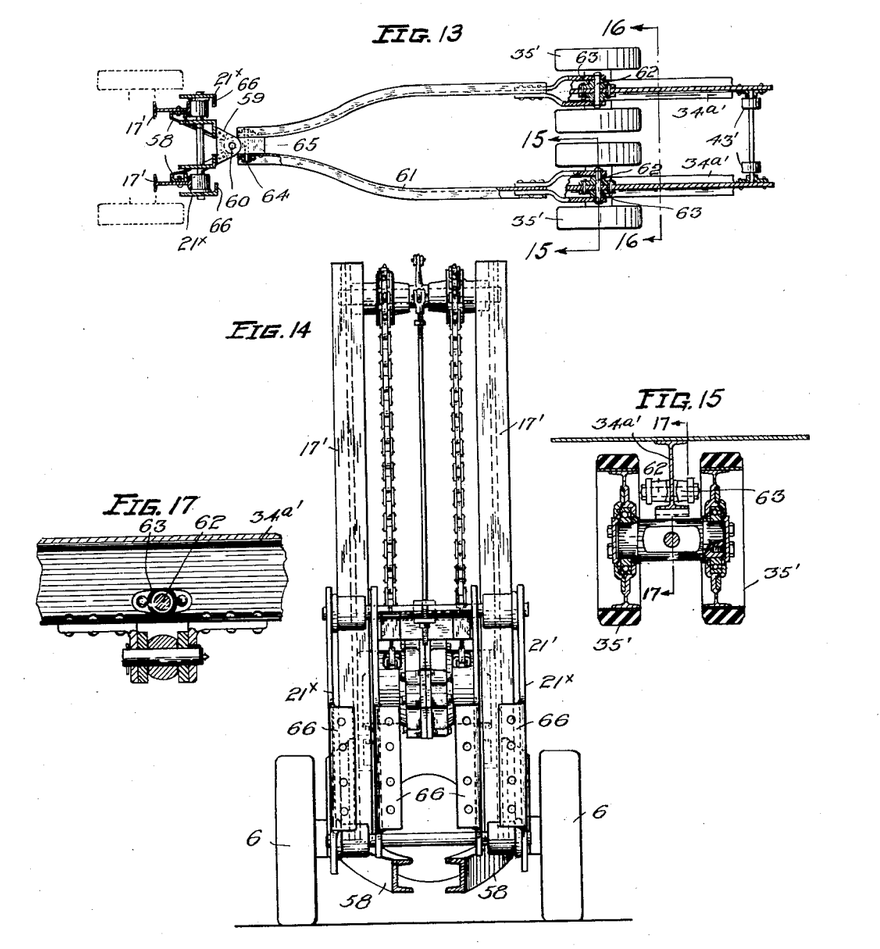
Figs. 13 and 14 are sections on the line 13—13 and 14—14, respectively, of Fig. 12.
Fig. 15 is a section on the line 15—15 of Fig. 13.
Fig. 17 is a section on the line 17—17 of Fig. 15.

Referring to Figs. 11 to 16, inclusive, $2'$, $3'$ indicate the traction and load carrying sections, respectively, of slightly different form as already set forth. 58 indicates a pair of channels each connected to the frame $4'$ and bent at their lower ends to extend outwardly from the end of the frame $4'$ and in converging relation, as shown in Figs. 13 and 14, their outer or free ends being connected by spaced plates 59. The plates 59 are formed with aligned openings in which is mounted a pivot pin 60. 61 indicates an auxiliary or sub-frame connected at its outer end to the frame bars $34a'$ and at its inner end connected to the pin 60. The frame 61 comprises a pair of members each of which carries at its outer end a pair of arms straddling the adjacent bar $34a'$ of the platform carrying frame $34'$ and pivotally connected to the bar by a pin 62 extending through it and the arms (see Figs. 13 and 17); the bar being reinforced around the opening for the pin 62 by bosses 63. The inner ends of the bars 61 are connected by a shaft or pivot pin 64 extending at right angles to the pin 60. 65 is a member having openings through it for the pins 60 and 64 whereby the frame 61 and channels 58 may articulate about a horizontal axis and a vertical axis, such member and the pivots therefor thereby constituting a universal joint so that the truck sections $2'$, $3'$, may occupy angular relations in substantially horizontal planes (see dotted lines in Fig. 11) to permit steering of the truck and operation thereof in handling loads, as well as in vertical planes, for example in taking inclined run-ways.

Figure 16:
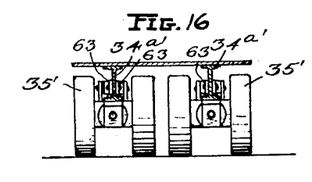
Fig. 16 is a section on the line 16—16 of Fig. 13.

The construction of the wheels 35' and the mounting of each pair thereof (see Figs. 15, 16 and 17) are preferably similar to the wheels 35 and their mountings, as shown in Figs. 8, 9 and 10 and already described.

The platform frame 34' is also similar in construction to the frame 34, except that its connection with the operating member 21' is slightly different due to the fact that the wheels 35' are maintained at a substantially fixed distance from the frame 4' by the auxiliary frame 61. In the form of construction shown in Figs. 1, 2, 3 and 4, the tilting of the platform frame 34 will cause the wheels 35 to roll inwardly on the surface (see dotted lines in Fig. 2) as the member 21 moves vertically; in the form of construction shown in Figs. 11 and 12, the wheels 35' being held by the frame 61 against inward rolling movement (except as noted below), provision must be made to permit the inner end of the frame 34' to swing through an arc, as indicated at x in Fig. 12, as it rocks on the shafts 62. For this purpose, the universal joint connection between the inner end of the frame 34' and operating member 21' includes a sliding connection so that the connecting element for the traction section 2' may move vertically on the guides 17' while the frame 34' rocks about the axis of the wheels 35' and the connecting element for the section 3' traverses the arc x. As the frame 61 is connected to the bars 34a', the rocking or tilting of the platform will cause the wheels 35' to roll a relatively short distance as shown in dotted lines in Fig. 12. As shown in Fig. 14, the plates 21x are provided with flanges 66, to which are secured angles 67. The angles 67 support a vertically arranged pivot 68. 69 indicates a device swingable on the pin 68 and having spaced arms 70, in which are formed elongated horizontal slots 71. 72 indicates a connecting member disposed between the arms 70 and carrying a horizontal pivot pin 73 which slides as well as rocks in the slots 71. The member 72 has legs 74 which are connected to the bars 34a' of the frame 34'. As will be understood, the parts just described constitute a universal joint between the frame 34' and member 21' whereas the slots 71 permit the pin 73 to traverse the arc x as the frame 34' rocks in either direction. As will be understood, the pins 60 and 68 are in alignment so that both frames 61 and 34' may, as a unit, assume varying angular relations to the section 2' in the operation of the truck. Where necessary to effect the discharge of the load, the elevating member may be raised to give the platform a greater inclination. In such position, the wheels 35' will disengage the floor or surface and the platform will be supported by the rollers 43' and the elevating member 21'.

Where the load is unduly heavy the platform may be inclined to the position shown in Figs. 2 and 4 and the truck driven to the station of discharge. In this position, the weight of the load is distributed on both the wheels 35 and rollers 43. When the truck is to be operated in this manner, the load is adjusted inwardly of the platform so that it will not engage the driving surface or floor.

In my construction of truck, bulky or relatively heavy loads, or loads that are both bulky and heavy may be transported from place to place since the truck sections are connected to permit their articulation for steering around corners as well as into and out of freight cars or other carriers. The sectional construction also enables the operative, by the contral of the track section, to manipulate the supporting section into positions for engaging or discharging loads where load handling trucks of present known constructions would be incapable of operating for lack of sufficient space.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

1. A truck comprising articulatable driving and load supporting sections, connections between said sections, wheels for said driving section, certain of said wheels being steerable, means for driving certain of said wheels for said driving section, said supporting section comprising a platform and a pair of wheels disposed below and intermediate the ends of said platform about the axis of which the platform may be tilted, and said connections between said sections comprising a vertical guide on the inner end of said driving section, a member movable upwardly and downwardly on said guide in a plane beyond the inner end of said driving section and a universal joint between said movable member and the inner end of said platform, said movable member when raised serving to tilt said platform into an inclined position to relate its free end relatively close to the floor, whereby the driving of said driving section in one direction will effect the riding of a load up said platform to load it thereon and driving of said driving section in the opposite direction will slide the load off the platform and discharge it on the floor, and said universal joint being disposed at a point beyond the axle for the proximate wheels of said driving section, and means for raising and lowering said movable member.

2. A truck comprising articulatable driving and load supporting sections, connections between said sections, wheels for said driving section, certain of said wheels being steerable, means for driving certain of said wheels for said driving section, said supporting section comprising a pair of wheels and a platform connected to the axle for said wheels intermediate the ends of said platform and tiltable thereon, and said connections between said sections comprising a vertical guide on the inner end of said driving section disposed in a plane beyond said inner end thereof, a device movable upwardly and downwardly longitudinally of said guide and a pivot connection between said device and the inner end of said platform, said movable member when raised serving to tilt said platform into an inclined position to relate its free end relatively close to the floor, whereby the driving of said driving section in one direction will effect the riding of a load up said platform to load it thereon and driving of said driving section in the opposite direction will slide the load off the platform and discharge it on the floor, and said pivot connection being disposed at a point beyond the axle for the proximate wheels for said driving section, and means for raising and lowering said movable device.

3. A truck comprising articulatable driving and load supporting sections disposed in end to end relation, a connection between the inner ends of said sections, wheels for said driving section, certain of said wheels being steerable, means for driving certain of said wheels for said driving section, said supporting section comprising a pair of wheels and a platform mounted on the axle for said wheels intermediate its ends and arranged to tilt into an inclined position to relate its free end relatively close to the floor, whereby the driving of said driving section in one direction will effect the riding of a load up said platform to load it thereon and driving of said driving section in the opposite direction will slide the load off the platform and discharge it on the floor, and said connection between said sections comprising a substantially vertical guide on the inner end of said driving section and extending downwardly below the frame thereof, a member slidably engaging said guide and movable in a plane beyond the inner end of said driving section, a pivotal connection between the inner end of said platform and said slidable member disposed beyond the axle for the proximate wheels of said driving section, and means for raising and lowering said member.

4. A truck comprising articulatable driving and load supporting sections disposed in end to end relation, said supporting section comprising a pair of wheels, a frame connected at its outer end to the axle for said wheels and connected at its inner end by a universal joint to the inner end of said driving section and a platform mounted intermediate its ends to swing substantially about the axis of the wheel axle to tilt into an inclined position to relate its free end relatively close to the floor, whereby the driving of said driving section in one direction will effect the riding of a load up said platform to load it thereon and driving of said driving section in the opposite direction will slide the load off the platform and discharge it on the floor, steering and driving wheels for said driving section, a vertical guide rigidly supported on the inner end of said driving section, a member slidably engaging said guide and movable in a plane beyond the inner end of said driving section, a universal joint connection between the inner end of said platform and said member, elements of said last mentioned universal joint being relatively movable bodily to permit tilting of said platform, said universal joint being disposed at a point beyond the axles for the proximate wheels of said driving section, and means for raising and lowering said member.

5. A truck comprising articulatable driving and load supporting sections disposed in end to end relation, said supporting section comprising a pair of wheels, a frame connected at its outer end to the axle for said wheels and connected at its inner end by a universal joint to the inner end of said driving section and a platform mounted intermediate its ends on the wheel axle to tilt into an inclined position to relate its free end relatively close to the floor, whereby the driving of said driving section in one direction will effect the riding of a load up said platform to load it thereon and driving of said driving section in the opposite direction will slide the load off the platform and discharge it on the floor, steering and driving wheels for said driving section, wheels for said supporting section, a vertical guide rigidly supported on the inner end of said driving section and extending below the frame therefor, a member slidably engaging said guide and movable in a plane beyond the inner end of said driving section, a universal joint connection between said member and the inner end of said platform, and means for raising and lowering said member.

6. A truck comprising articulatable driving and load supporting sections, steering and driving wheels for said driving section, said supporting section comprising a pair of wheels and a platform mounted intermediate its ends on the axle for said wheels and arranged to tilt from a horizontal into an inclined position to relate its free end relatively close to the floor, whereby the driving of said driving section in one direction will effect the riding of a load up said platform to load it thereon and driving of said driving section in the opposite direction will slide the load off the platform and discharge it on the floor, and a single universal joint connection between the inner end of said platform and said driving section, the element of said connection carried by said driving section being movable vertically in a plane beyond said driving section to dispose said joint outwardly of the axle for the wheels for said section and arranged to tilt said platform when operated.

7. A truck comprising articulatable driving and load supporting sections, steering and driving wheels for said driving section, said supporting section comprising a pair of load wheels and a platform mounted to tilt from a horizontal into an inclined position to relate its free end relatively close to the floor, whereby the driving of said driving section in one direction will effect the riding of a load resting directly upon the floor up said platform to load it thereon and driving of said driving section in the opposite direction will slide the load off the platform and discharge it on the floor, a vertical guide carried by the inner end of said driving section, an elevating member slidably engaging said guide and movable in a plane beyond the axle of the inner wheels for said driving section, means for raising and lowering said elevating member, and a single universal joint connection between the inner end of said platform and the outer portion of said elevating member.

8. A truck comprising articulatable driving and load supporting sections, a connection between said sections, steering and driving wheels for said driving section, said supporting section comprising a plurality of axles disposed in transverse alignment and each trunnioned intermediate its ends on a longitudinal axis and carrying load wheels at its opposite ends and a platform mounted intermediate its ends to tilt about the axis of the load wheels into an inclined position to relate its free end relatively close to the floor, whereby the driving of said driving section in one direction will effect the riding of a load up said platform to load it thereon and driving of said driving section in the opposite direction will slide the load off the platform and discharge it on the floor, and said connection between said sections comprising a vertical guide on the inner end of said driving section, a member movable vertically thereon and a universal joint between said member and the inner end of said platform, and means for moving said member vertically.

9. A truck comprising articulatable driving and load supporting sections, a connection between said sections, wheels for said driving section, certain of said wheels being steerable, means for driving certain of said wheels for said driving section, said supporting section comprising a platform and a pair of wheels disposed below and intermediate the ends of said platform and said connection between said sections comprising a vertical guide on the inner end of said driving section, a member movable upwardly and downwardly on said guide and a universal joint between said movable member and the inner end of said platform, said movable member when raised serving to tilt said platform into an inclined position to relate its free end relatively close to the floor, whereby the driving of said driving section in one direction will effect the riding of a load up said platform to load it thereon and driving of said driving section in the opposite direction will slide the load off the platform and discharge it on the floor, means for raising and lowering said movable member, and auxiliary wheels disposed outwardly of the wheels for said supporting section and arranged to co-operate with said movable member to support the platform in an inclined position, said auxiliary wheels serving as a fulcrum and a support for the platform when the latter is inclined to an abnormal position.

10. A truck comprising articulatable driving and load supporting sections, wheels for each said section, certain of said wheels being steerable, means for driving certain of said wheels for said driving section, said supporting section including a platform mounted to tilt into an inclined position to relate its free end relatively close to the floor, whereby the driving of said driving section in one direction will effect the riding of a load up said platform to load it thereon and driving of said driving section in the opposite direction will slide the load off the platform and discharge it on the floor, means on one of said sections for tilting said platform, said tilting means comprising a substantially vertical guide, an elevating member slidably engaging said guide, a pivotal connection between the inner end of said platform and said elevating member and means for raising and lowering said member, and auxiliary wheels outwardly of the wheels for said supporting section and arranged to co-operate with said tilting means to support the platform in an inclined position the elevating member at the inner end of the platform having a movement to tilt the platform sufficient to raise the supporting wheels for the platform off the floor and thereby support the load increasingly on the said auxiliary wheels, said auxiliary wheels serving as a fulcrum and a support for the platform when the latter is inclined to an abnormal position.

11. A load-carrying device comprising a frame, a plurality of axles disposed in transverse alignment between the outer and inner ends of said frame and each carrying load wheels at its opposite ends and means for trunnioning each axle intermediate its ends on said frame on a longitudinal axis, said frame being tiltable about said axles, and a sub-frame adapted to be connected at its inner end to a driving member and pivotally connected at its outer end to said frame on an axis disposed in a vertical plane cutting the axis of said axles when said frame is in horizontal position.

12. A truck construction comprising articulatable sections disposed end to end and having a connection between them to permit articulation of said sections when moving in either direction, wheels for the inner end of one section, a steerable wheel for the outer end of said section swingable on a vertical axis cutting its tread, the other section comprising a pair of wheels and a platform mounted on the axle for said wheels intermediate its ends and arranged to tilt into an inclined position, said connection between said sections comprising a guide and a member movable upwardly and downwardly on said guide and pivotally connected to the inner end of said platform to tilt it, and means for operating said member.

13. A truck comprising articulatable driving and load carrying sections disposed in end to end relation, said supporting section comprising a pair of wheels, a frame connected at its outer end to the axle for said wheels and having a universal joint connection at its inner end with said driving section and a platform mounted intermediate its ends to swing substantially about the axis of the wheel axle for said wheels into an inclined position to relate its free end relatively close to the floor, for receiving or discharging a load, steering and driving wheels for said driving section, a support normally disposed substantially vertically on the inner end of one of said sections, and means for swinging said platform, said means including an endless chain movably mounted on said support and having a run extending longitudinally of and parallel thereto, connections between the inner end portion of said platform and said chain and means for driving said chain in either direction.

14. A truck comprising articulatable driving and load carrying sections disposed in end to end relation, said load carrying section comprising a pair of wheels and a frame connected at its outer end to the axle for said wheels and connected at its inner end by a universal joint to the inner end of said driving section, a platform mounted intermediate its ends to swing substantially about the axis of the wheel axle for said wheels to tilt into an inclined position to relate its outer end relatively close to the floor for receiving or discharging a load, steering and driving wheels for said driving section, a vertical guide mounted on the inner end of one of said sections, a member slidably engaging said guide and movable upwardly and downwardly thereon, a universal joint connection between said member and the inner end portion of said platform, one element of said connection being formed with an elongated slot and another element thereof being provided with a pin pivotally and slidably fitting said slot and movable therein to permit swinging of said platform, and means for moving said member upwardly and downwardly.

In testimony whereof, I have hereunto subscribed my name.

EDWARD H. REMDE.